No. 798,831. PATENTED SEPT. 5, 1905.
D. J. QUIGLEY.
ATTACHMENT FOR VEHICLE SHAFTS.
APPLICATION FILED OCT. 6, 1904.
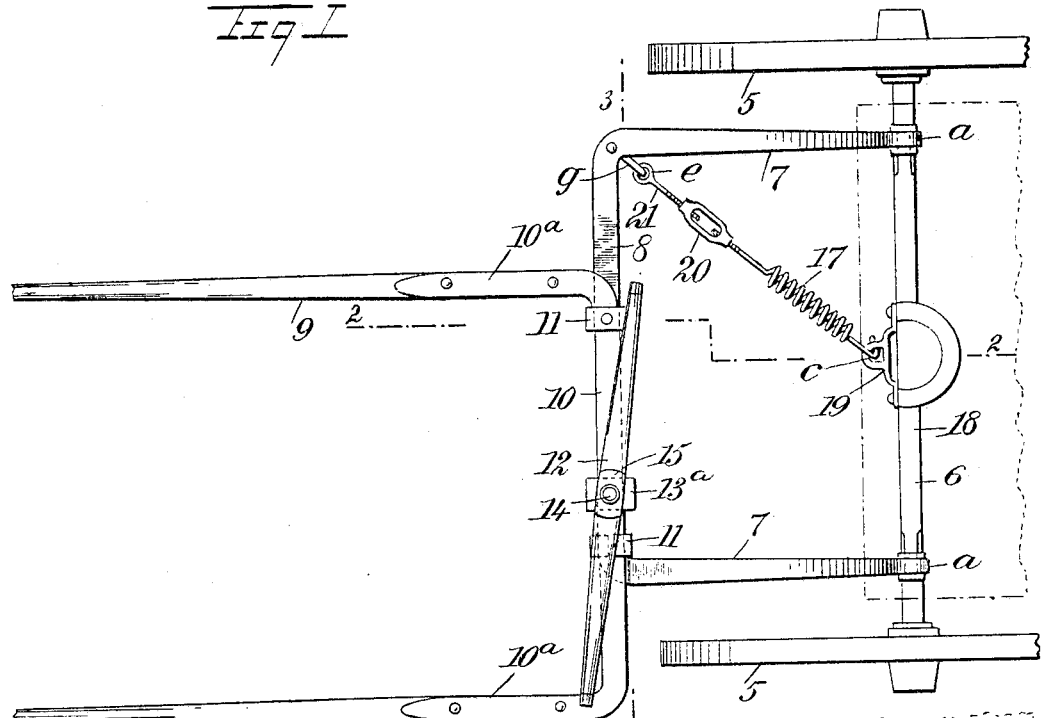
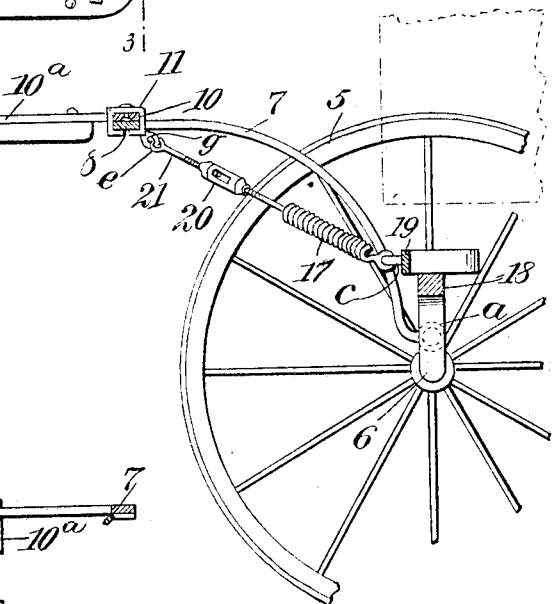
WITNESSES:
H. Walker
Wm. P. Patton
INVENTOR
Daniel J. Quigley
BY
ATTORNEYS

UNITED STATES PATENT OFFICE.

DANIEL J. QUIGLEY, OF LITCHFIELD, MINNESOTA.

ATTACHMENT FOR VEHICLE-SHAFTS.

No. 798,831.  Specification of Letters Patent.  Patented Sept. 5, 1905.

Application filed October 6, 1904. Serial No. 227,372.

*To all whom it may concern:*

Be it known that I, DANIEL J. QUIGLEY, a citizen of the United States, and a resident of Litchfield, in the county of Meeker and State of Minnesota, have invented a new and Improved Attachment for Vehicle-Shafts, of which the following is a full, clear, and exact description.

This invention relates to means for connecting the thills or shafts of vehicles with their running-gears so that the shafts may be shifted laterally to permit the single animal drawing the vehicle to travel at one side of the center of a country road out of the rut and on firm ground, while the wheels run on the beaten track, and has for its object to provide novel features of construction for an attachment of the type indicated which is superior to other devices of a like character, affording means for adjustably counteracting side draft and permitting the shafts to be shifted toward or from the center of the axle without the use of tools.

The invention consists in the novel construction and combination of parts, as is hereinafter described, and defined in the claims.

Reference is to be had to the accompanying drawings, forming a part of this specification, in which similar characters of reference indicate corresponding parts in all the figures.

Figure 1 is a plan view of the front axle and wheels thereon and of a pair of shafts connected with the axle by the improvement. Fig. 2 is a longitudinal sectional view substantially on the line 2 2 in Fig. 1. Fig. 3 is a transverse sectional view substantially on the line 3 3 in Fig. 1, and Fig. 4 is a transverse sectional view on the line 4 4 in Fig. 3.

The wheels 5 5 (shown partially) and the front axle 6, whereon said wheels are mounted, may be portions of vehicle running-gears of any construction, as the improvement is applicable to wheeled vehicles of any kind and also to sleighs, if this is desired, and comprises the following details.

A draft-frame consisting of two nearly parallel bars 7 7, spaced apart by a transverse bar 8, is connected with the axle 6 by hinged members $a$, formed on ends of the bars 7, said members engaging the axle-body at points equally distant from the wheels 5. A pair of shafts 9 9 are spaced apart at their rear ends by a flat connecting-bar 10, which is formed with like strap-plates $10^a$, one at each end. These straps, seating upon the rear portions of the shafts, are secured thereto by bolts or like means. As shown in Fig. 2, the parallel bars 7 are arched upward and forward, thus raising the shafts 9 and their connecting-bar 10 a suitable distance above the ground for convenient connection of a draft-animal to the shafts in the usual way.

The connecting-bar 10 is seated upon the transverse bar 8 of the draft-frame and is held to slide longitudinally thereon by two enveloping clip-bands 11. These bands are rectangular in contour and embrace the bars 8 10, as shown. Said clip-bands are secured one on each band, respectively, near a strap-plate $10^a$ and a bar 7, thus permitting the spaced shafts 9 to be moved laterally and dispose one shaft outside the tread of the wheels 5 at the side of the vehicle toward which the shafts are shifted, as appears in Fig. 1.

A swingletree 12 is held to rock horizontally and slide along with the transverse bar 10 by means of a rectangular yoke-piece which is bent from a flat bar to afford two depending spaced and parallel limbs 13, joined together by a web-plate $13^a$. A pivot-bolt 14 passes up through the center of the web-plate $13^a$ and is affixed thereto by its head, the body of the bolt being inserted loosely through a perforation central in the swingletree 12, which is held from displacement by a washer-plate 15, that bears upon the upper side of the swingletree and is secured upon the end of the pivot-bolt, that projects therethrough. Between the spaced limbs 13 of the yoke-piece a locking-dog 16 is held to rock by a pivot $16^a$, said dog consisting of a cam-head, through which the pivot is loosely inserted, but is secured by its ends in the limbs 13. The cam-head of the dog 16 is provided with a short handle-lever $16^b$, which affords means for manually rocking the head. The swell on the cam-head is so disposed that when the lever $16^b$ is pendent said swell is removed from contact with the transverse bar 8 of the draft-frame, but will bear forcibly thereon if the lever is rocked into a horizontal position, as indicated by dotted lines in Fig. 3.

It will be apparent that from the relative arrangement of the clip-bands 11 on the transverse bar 8 and on the connecting-bar 10, together with the fixture of the yoke-piece on the connecting-bar 10 at its center and pivotal connection of the swingletree 12 with the yoke-piece, the swingletree may rock freely in a horizontal plane centrally between the shafts 9, and said shafts, along with the connecting-bar 10, may be shifted leftward and be secured in such a position with the left-hand shaft disposed slightly past the left-hand front wheel 5, as is shown in Fig. 1.

The improvement is particularly well adapted for service where the vehicle provided therewith is drawn over a country road, which is generally cut into a rut central between the surfaces over which the wheels of the vehicle travels, as it will be seen that by shifting the shafts 9 toward the left side of the vehicle the draft-animal hitched to the swingletree 12 between the shafts will be permitted to travel on firm ground that usually intervenes between the rut in the center of the road-bed and the wheel-tracks. No difficulty will be experienced in passing other vehicles on the road, as from the relative position of the left-hand shaft if the animal is driven a safe distance from the other conveyance the vehicle passing the latter will pass freely and not interfere therewith. On approach to roadways in a town or if the country road is level and solid the shafts 9 may be shifted to a central position on the draft-frame in a few seconds by releasing the locking-dog 16, then sliding the bar 10 and relocking the dog, as hereinbefore explained, which arrangement of the shafts permits the animal to travel centrally between the wheels 5 in an obvious manner. To obviate side draft when the shafts are shifted leftward, a counteracting brace is provided, consisting of a coiled spring 17, that at one end is coupled to the sand-board 18 of the vehicle by a bracket 19, that is formed with an eye $c$, which a hook on the spring engages with.

The rod material of which the spring 17 is formed extends at the opposite end thereof, and upon this extension, which is threaded, one end of a turnbuckle 20 is screwed, and into the opposite end of the turnbuckle the threaded end of a link-rod 21 is screwed that at its opposite end is formed with an eye $e$, engaged by a hook or eye $g$, secured on the draft-frame, preferably at the corner thereof, where the right-hand member 7 of the draft-frame joins the transverse bar 8, as is shown in Fig. 1. It will be seen that the turnbuckle 20 enables an adjustment for length of the brace, so that its counteracting pull may be graduated and draft strain on the frame 7 7 8 be distributed more evenly upon the axle 6. When the shafts 9 are disposed centrally on the transverse frame-bar 8, the turnbuckle 20 should be adjusted to relax the pull of the spring 17, as in this case the brace is not required.

It is found that the provision of the coiled spring 17 as a portion of the diagonal brace is very essential, as its resilience compensates for uneven pulling strain due to travel of the animal over high and low places in the road-bed that causes a rocking movement of the shafts and draft-frame.

Having fully described my invention, I claim as new and desire to secure by Letters Patent—

1. The combination with a front axle, and a draft-frame consisting of a front transverse bar and two side members spaced apart by said transverse bar, ends of said members being hinged upon the axle, of a pair of shafts, a spacing and connecting bar joining the rear ends of the shafts, said bar being slidably held on the transverse member of the draft-frame, bands loosely embracing the connecting-bar and the transverse frame member, and means for releasably securing the spacing and connecting bar on said transverse frame member, comprising an inverted-U-shaped yoke straddling the said bar and transverse frame member with its connecting member resting upon the said bar, a swingletree pivoted to the connecting member of the yoke, and an eccentric lever pivoted in the yoke and adapted for clamping the frame member upon the spacing and connecting bar.

2. The combination with shafts made in two sections, the inner section being hinged to the axle and the outer section adjustable laterally on the inner section, of an adjustable spring-brace having one end secured to one corner of the inner shaft-section and its other end to the sand-board of the vehicle.

3. The combination with shafts comprising a draft-frame having side members hinged to the axle and connected at their forward ends by a cross-bar, and thills connected by a cross-bar, the cross-bar of the thills being adjustably secured upon the cross-bar of the frame, of a brace for counteracting side draft, comprising a spring loosely connected to the sand-board of a vehicle, a rod having one end loosely secured to one corner of the draft-frame, and a turnbuckle connecting said rod and spring.

4. In a device of the character described, the draft-frame hinged on an axle, thills adjustable laterally on the draft-frame, and the side-draft-counteracting brace extended between a corner of the frame and the sand-board of the vehicle, comprising two rod members threaded at their adjacent ends, a turnbuckle screwed upon said threaded ends for changing the length of the brace, and a strong coiled spring integral with one rod member rendering the brace measurably resilient.

In testimony whereof I have signed my name to this specification in the presence of two subscribing witnesses.

DANIEL J. QUIGLEY.

Witnesses:
J. H. BACON,
JAMES CAMPBELL.